United States Patent
Mulas et al.

(12) 
(10) Patent No.: US 6,465,574 B1
(45) Date of Patent: Oct. 15, 2002

(54) PROCESS AND COMPOSITION FOR MANUFACTURING ARTICLES BY POWDER MOULDING AND ARTICLES THUS OBTAINED

(75) Inventors: Carlo Mulas, Mogliano Veneto (IT); Rainer Koehler, Pegnitz (DE)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 09/763,219

(22) PCT Filed: Jun. 14, 2000

(86) PCT No.: PCT/EP00/05443

§ 371 (c)(1), (2), (4) Date: Feb. 16, 2001

(87) PCT Pub. No.: WO00/78862

PCT Pub. Date: Dec. 28, 2000

(30) Foreign Application Priority Data

Jun. 18, 1999 (EP) ............................................. 99201962

(51) Int. Cl.⁷ ......................... C08L 23/16; C08L 23/20; C08L 23/12; C08L 25/10
(52) U.S. Cl. ....................... 525/191; 525/216; 525/232; 525/240; 525/241
(58) Field of Search ................................. 525/191, 216, 525/232, 240, 241

(56) References Cited

U.S. PATENT DOCUMENTS

| 476,951 A | 6/1892 | Van Norman |
| 2,882,263 A | 4/1959 | Natta et al. |
| 3,112,300 A | 11/1963 | Natta et al. |
| 3,362,940 A | 1/1968 | Edwards et al. |
| 5,552,482 A | * 9/1996 | Berta .......................... 525/88 |
| 5,702,827 A | 12/1997 | Itoh et al. ................... 428/519 |

FOREIGN PATENT DOCUMENTS

| EP | 0045977 | 2/1982 |
| EP | 0361494 | 4/1990 |
| EP | 0472946 | 3/1992 |
| EP | 0479580 | 4/1992 |
| EP | 0633289 | 1/1995 |
| EP | 0637610 | 2/1995 |
| EP | 0767209 | 4/1997 |
| WO | 9821273 | 5/1998 |

* cited by examiner

Primary Examiner—Nathan M. Nutter

(57) ABSTRACT

A process comprising powder moulding a polymer composition having a Shore D hardness value less than 40 points; said polymer composition comprising:

1) a polyolefin composition consisting of:
   i) 5 to less than 100 parts by weight of a crystalline or partially crystalline isotactic polymer of 1-butene; and
   ii) more than 0 to 95 parts by weight of a thermoplastic elastomeric polyolefin composition having a melt flow rate of 20–100 g/10 min; or
2) a polyolefin composition consisting of:
   iii) 100 parts by weight of a crystalline or partially crystalline isotactic polymer of 1-butene or composition (1); and
   iv) more than 0 to 100 parts by weight of an elastomeric polymer;

provided that when the polymer of 1-butene is a homopolymer or a copolymer with less than 2 wt % of comonomer, polymer compositions (1) and (2) contain at least 5 parts by weight of an elastomeric polymer.

19 Claims, No Drawings

PROCESS AND COMPOSITION FOR MANUFACTURING ARTICLES BY POWDER MOULDING AND ARTICLES THUS OBTAINED

The present invention relates to a process for preparing moulded articles by powder moulding. It also relates to polyolefin compositions, in particular heterophasic polyolefin compositions, suitable for preparing said articles and to the moulded articles thus obtained.

The term powder moulding is used in broad sense in the present application, to embrace processes where moulded articles (in particular, laminar or hollow articles) are obtained by deposition of polymer powders on the inside wall of a mould and by melting such powders in contact with the mould in one or more steps. Therefore, such term includes slush moulding and other known processes, such as the rotary moulding process.

Thanks to the particular polyolefin composition used in the process of the present invention, the said process is particularly suitable for producing laminar articles with a complex shape.

Thermoplastic elastomeric polyolefin compositions have already been used in slush moulding processes. Hence, thanks to the use of said compositions, laminar articles with a high degree of softness are already available.

European patent applications No. 637610 and No. 97/952761.1 (WO 98/21273) describe said process and articles. However, the compositions used in the process described in the above-mentioned patent applications are suited for producing articles with a simple shape only. In fact, the demoulding of an article with complex shape is difficult because of the relative stiffness of the said compositions.

Moreover, when an industrial plant is used for carrying out the process described in the said patent applications, it is necessary to heat the mould to high temperatures, i.e. at least to 250° C., in order to sinter the polymer powder.

It has now been found that moulded articles (for instance synthetic leathers) having a good degree of softness even in the absence of extender oil, soft touch and good mechanical properties can be obtained by using powders of particular polyolefin compositions, without incurring difficulties in the demoulding step.

Moreover, thanks to the particular type of polymer composition it is now possible to heat the mould of an industrial plant to temperatures lower than usual, i.e. temperatures of less than 250° C. Lower temperatures are a great advantage because they allow to shorten the cycle time, thereby increasing the productivity. Moreover, less energy is required in order to heat the mould.

As said above, an example of laminar articles obtainable with the process of the present invention are synthetic leathers. For example, synthetic leathers are used in the automotive industry vehicle parts. The synthetic leather of the present invention can be used to cover dashboards and handles, for instance.

Therefore, the present invention provides a process for the manufacture of a moulded article comprising the powder moulding of a polymer composition having a Shore D hardness value of less than 40 points, preferably from 70 Shore A points to 35 Shore D points, according to method ASTM D 2240, said polymer composition comprising:

1) a polyolefin composition consisting of:
  i) 5 to less than 100, such as 5 to 95, preferably 20–70, most preferably 20–50, parts by weight of a crystalline or partially crystalline isotactic polymer of 1-butene; and
  ii) more than 0 to 95, such as 5 to 95, preferably 30–80, most preferably 50–80, parts by weight of a thermoplastic elastomeric polyolefin composition having a melt flow rate of 20–100 g/10 min (at 230° C. and 2.16 kg); or
2) a polyolefin composition consisting of:
  iii) 100 parts by weight of a crystalline or partially crystalline isotactic polymer of 1-butene or composition (1); and
  iv) more than 0 to 100, such as 3 to 100, preferably 5–100, parts by weight of an elastomeric polymer;
with the proviso that when the polymer of 1-butene is a homopolymer or a copolymer with less than 2% by weight of comonomer, polymer compositions (1) and (2) contain at least 5, preferably at least 10, parts by weight of an elastomeric polymer.

The said elastomeric polymer can be either polymer (iv) or the elastomeric polymeric fraction of the thermoplastic elastomeric composition (ii).

Generally, the melt flow rate (MFR) value (according to ASTM D 1238, condition L, MFRL) of the above mentioned polymer composition to be used in the process of the present invention ranges from 20 to 100 g/10 min.

Said crystalline or partially crystalline polymer of 1-butene suitable for use in the present invention is selected from both the homopolymers and copolymers of butene-1. In the copolymers, the comonomers are preferably selected from ethylene and $C_3$–$C_{10}$ α-olefins of formula $CH_2$=CHR, where R is a $C_1$–$C_8$ linear or branched alkyl radical, such as propylene and pentene-1. The preferred comonomers are ethylene and propylene. The amount of comonomer is generally from 0.5 to 50%, preferably from 2 to 10%, by weight. Suitable examples are copolymers of butene-1 with 2 wt. % to 6 wt. % ethylene.

The polymers of butene-1 typically have an MFR value varying from 5 to 100 g/10 min (at 190° C. and 2.16 kg).

Said 1-butene polymers are commercially available and can be obtained using known polymerisation processes and catalysts. The polymerisation of 1-butene, optionally in the presence of an olefin comonomer such as ethylene or propylene, can be carried out using Ziegler-Natta or metallocene catalysts. Specific examples of said catalysts are the catalytic systems described in European patent applications EP-A-45977 and EP-A-361494, and the catalytic systems containing metallocene catalysts described in U.S. Pat. No. 476,951. Examples of preparation of polymers of 1-butene are disclosed in U.S. Pat. Nos. 2,882,263, 3,362,940 and 3,112,300.

The thermoplastic elastomeric polyolefin composition (ii) comprises a crystalline propylene polymer and ethylene-propylene rubber, for example. In such a case, the total amount of copolymerized ethylene may be from 15 to 60% by weight.

A suitable example of composition (ii) is a thermoplastic elastomeric polyolefin composition (I) comprising (parts and percentages by weight):
a) 10–40 parts, preferably 20–40, of an isotactic propylene homopolymer having a content of fraction soluble in xylene at room temperature greater than 80%, preferably greater than 90%, or a propylene random copolymer with at least one comonomer selected from ethylene and $C_4$–$C_{10}$ α-olefins of formula $CH_2$=CHR, where R is a $C_2$–$C_8$ linear or branched alkyl radical, said copolymer containing greater than 80% of propylene and having accountant of fraction soluble in xylene at room temperature greater than 80%, preferably greater than 90%;
b) 0–20 parts of a copolymer containing ethylene, insoluble in xylene at room temperature; and c) 40–95 parts, preferably 40–80, of an elastomeric polymer fraction consisting of a copolymer of ethylene with at least one comonomer selected from $C_3$–$C_{10}$ α-olefins of formula $CH_2$=CHR, where R is a $C_1$–$C_8$ linear or branched alkyl radical, and optionally with a small quantity of diene, said polymer being soluble in xylene at room temperature, having an intrinsic viscosity ranging from 1 to 4 dl/g and containing ethylene in quantities of less than 40%, preferably 15 to 38%, more preferably 15–35%.

For room temperature, a temperature of about 23° C. is meant.

Examples of the above-mentioned thermoplastic elastomeric polyolefin composition (I)are described in European patent application EP-A-0 472 946.

The copolymer constituting fraction (b) may be rich in the said $C_3$–$C_{10}$ α-olefins or may be an essentially linear copolymer of ethylene with the said $C_3$–$C_{10}$ α-olefins, such as linear low density polyethylene (LLDPE), for example.

When fraction (b) is present, it is preferable that the quantity of the said fraction be greater than 1 part by weight.

Whenever present, the quantity of diene in said fraction (c) generally ranges from 0.5 to 10% by weight, preferably from 1 to 4%, with respect to the total weight of fraction (c). Specific examples of the said dienes are 1,3-butadiene, 1,4-hexadiene, 1,5-hexadiene and 5-ethylidene-2-norbornene.

The above-mentioned thermoplastic elastomeric polyolefin composition can be prepared by mixing all the components, i.e. (a), (c) and optionally (b), in the molten state, i.e. above their melt or softening temperature. Alternatively, it may be prepared by way of sequential polymerisation in two or more stages in the presence of a highly stereospecific Ziegler-Natta catalyst. In particular, the catalyst system comprises (i) a solid catalyst component containing a titanium compound and an electron-donor compound, both supported on an activated magnesium halide, and (ii) an Al-trialkyl compound and, optionally, an electron-donor compound.

Examples of sequential polymerisation process are described in the above-mentioned European patent application EP-A-0472 946.

If said component (b) is present, it is preferable that the (b)/(c) weight ratio be less than 0.4, in particular from 0.05 to 0.3. Moreover, it is preferable that the weight percentage of fraction (c) with respect to the total weight of the thermoplastic elastomeric polyolefin composition range from 50 to 90%, in particular from 50 to 80%.

As said above, the polymer composition (2) may comprise an elastomeric polymer in addition to the polymer of butene-1 or the mixture thereof with a thermoplastic elastomeric polyolefin composition.

Any type of elastomeric polymer may be added in polyolefin composition (2). Examples of particularly suitable elastomeric polymers are: styrene polymers; conventional elastomeric polymers of ethylene with propylene, and optionally small amounts of diene, containing from 40 to 75% by weight of ethylene (EPR and EPDM rubbers); elastomeric copolymers of ethylene with $C_4$–$C_{10}$ α-olefins of formula $CH_2$=CHR, where R is a $C_2$–$C_8$ linear or branched alkyl radical, such as 1-butene and 1-octene, having a narrow distribution of molecular weights.

Examples of styrene polymers are saturated and unsaturated block copolymers of styrene with olefins, in particular ethylene, butadiene and isoprene. Particular examples are styrene-isoprene-styrene block copolymers and styrene-ethylene-butylene-styrene block copolymers. Specific examples are triblock copolymers with polystyrene end blocks and a rubbery poly(ethylene-butylene) mid block. Said elastomeric copolymers are known with the trade names of Kraton® G 1652 and Kraton® G 1657, and commercialised by Shell Chemical Company.

The dienes optionally present in the EPDM rubber are the same and in the same amount as those indicated above for fraction (c) of the thermoplastic elastomeric polyolefin composition (I).

Examples of elastomeric copolymers having a narrow distribution of molecular weights are copolymers of ethylene with $C_3$–$C_{10}$ α-olefins, containing at least 20% by weight, preferably 20–70%, of comonomer and having a Mw/Mn ratio of less than 4, preferably less than 3. Specific examples of said copolymers are copolymers of ethylene with 25 wt % of 1-octene or 34 wt % of 1-octene and having Shore A hardness of 75 points according to the method described below and density of about 0.87 g/ml according to ASTM D 792 method. Another example is the copolymer of ethylene with 22.1 wt % of 1-butene having Shore A hardness of 85 points and a density of 0.88 g/ml.

The desired MFR value of the above-mentioned polyolefin compositions and thermoplastic elastomeric polyolefin compositions to be used in the process of the present invention can be obtained directly in polymerisation, by properly controlling the molecular weight regulating agent (hydrogen, for example). Alternatively, it can be obtained by subjecting the said compositions to a chemical visbreaking process.

The visbreaking of the polymer chain is carried out by conventional techniques. One of them is based on the use of peroxides, which are added to the polymers in quantities that allow one to obtain the desired degree of visbreaking. The peroxides most commonly used in the visbreaking process preferably have a decomposition temperature ranging from 150 to 250° C. Examples of the said peroxides are di-tert-butyl peroxide, dicumyl peroxide, 2,5-dimethyl-2,5-di(tert-butylperoxy)hexyne and 2,5-dimethyl-2,5-di(tert-butylperoxy)hexane. The quantities of peroxide used for the visbreaking process preferably range from 0.05% to 1% by weight with respect to the polymer.

Both the elastomeric polymer present in the thermoplastic elastomeric polyolefin composition (ii) and the elastomeric polymer (iv) may be in the form of a partially cross-linked polymer.

By "partially cross-linked" it is meant that the degree of cross-linking in terms of gels with respect to the weight of the fraction of elastomeric copolymer soluble in xylene at room temperature before cross-linking is preferably less than or equal to 70%, more preferably less than 50%, for example from 3 to 45%. The gel content corresponds to the fraction of elastomeric copolymer that is rendered insoluble by cross-linking.

An indirect evaluation of the degree of cross-linking can be provided, as indicated above, by the quantity of gels that forms due to the cross-linking, which reduces the solubility of the elastomeric polymer of the composition. Said quantity is calculated using the following formula:

$$\%\text{gel}=(C-x)\times(1/C)\times100,$$

where C is the percentage of the elastomeric polymer in the composition before cross-linking, while x is the soluble fraction of the partially cross-linked polymer. In said formula, the solubility contribution of component (a) in the thermoplastic elastomeric polyolefin composition (I) is overlooked since it is very nominal compared to that of component (c).

The cross-linked polymer is obtained by cross-linking the corresponding polymer with suitable types and amounts of cross-linking agents. Any cross-linking agent known in the art can be used. In particular one can use as cross-linking agents the organic peroxides that have, for example, a half-life ranging from 3 to 20 minutes, preferably from 7 to 18 minutes, at 160° C. Specific examples of peroxides are: 1,1'-bis(tert-butylperoxy)diisopropylbenzene, 2,5-di(tert-butylperoxy)-2,5-dimethylhexane, butyl-4,4'-bis(tert-butylperoxy)valerate and dicumyl peroxide. The peroxides are generally used in quantities ranging from 0.5 to 5%, preferably from 1 to 3%, by weight with respect to the total weight of the composition subjected to cross-linking.

Together with the peroxides one can use a cross-linking coagent. Preferred examples of coagent are the 1,2-polybutadienes, triallyl cyanurate, triallyl isocyanurates, ethylene glycol, dimethyl methacrylate, divinylbenzene and furan derivatives as described in European patent application No. 97/952761.1 (WO 98/21273).

Generally the 1,2 polybutadienes have a molecular weight of at least 1300, preferably ranging from 2400 to 13000. The content of vinyl groups in configuration 1,2 is preferably equal to or greater than 50%, in particular from 50 to 90%. A specific example is the Lithene PH (by Revertex).

A preferred cross-linking process consists of subjecting the polymer to be cross-linked (in particular, the polyolefin composition (1) or (2) or the thermoplastic elastomeric composition (ii)) to a mixing treatment at temperatures equal to or greater than the softening or melting temperature of the composition in the presence of a cross-linking agent, which can be added before, during or after the first mixing phase, and continuing said mixing during the cross-linking phase (dynamic cross-linking). The mixing treatment can be carried out, for example, in an internal mixer (Banbury type) or in twin screw and/or Buss extruder, or in a system which combines the two.

The dynamic cross-linking process is carried out for a period of time preferably ranging from 40 seconds to 6 minutes, and at a temperature preferably in the range from 140 to 220° C.

The cross-linking process may also be carried out on a portion of the polymer composition, which is then mixed with the remaining portion to obtain the final composition.

Particularly suitable and inventive compositions to be used for preparing the powders employed in the process of the present invention, are polymer compositions with an MFR value of 20 to 100 g/10 min comprising (percentages and parts by weight):
1) a crystalline or partially crystalline polymer of 1-butene, preferably in amounts from higher than 25 to 97%, more preferably from 26 to 70%, most preferably from 26 to 50%;
2) a thermoplastic elastomeric polyolefin composition (I), which is optionally partially cross-inked, preferably in amounts from 3 to less than 75%, more preferably from 30 to 74%, most preferably from 50 to 74%; and, optionally,
3) an elastomeric polymer in amounts higher than 0 up to 100, preferably from 5 to 100, most preferably from 5 to 60, parts with respect to 100 parts of a mixture of components (1) and (2).

Usually, when a crystalline propylene polymer is present, two melting points may be distinguished in the polymer compositions suitable for carrying out the present process. The melting point at a lower temperature is due to the fusion of crystalline portion of the polymer of 1-butene, while the one at a higher temperature is due to the fusion of crystalline portion of the polymer of propylene. When the said polymer compositions are subjected to two different and subsequent determinations of the melting points, typically the melting point at a lower temperature in the second determination is lower of at least 10° C. than the one at a lower temperature in the first determination. The melting points are determined by Differential Scanning Calorimetry (DSC) as below defined.

The above polymer compositions can also contain the usual substances that are added to polymers, such as stabilising agents, plasticizing agents, mineral fillers, carbon black and pigments. Moreover, they preferably contain a flowing agent such as silica, in quantities generally ranging from 0.5 to 2% by weight.

The said polymer compositions are prepared with any known method and equipment used for blending polyolefins, such as a Banbury, a Buss, or a single-screw and/or double-screw extruder. Then the polymer composition is reduced into powder. For instance, it can be subjected to milling at a very low temperature, using liquid nitrogen as the cooling medium. For use in the powder moulding process it is preferable that the particles of the polyolefin composition have a regular form. It is also preferable that they have a narrow particle size distribution and a small diameter. In particular, it is preferable that the diameter of the particles be less than 500 $\mu$m, preferably less than 350 $\mu$m; more preferably not more than 5% by weight of the particles have a diameter greater than 300 $\mu$m, most preferably greater than 250 $\mu$m. For example, one can use a powder where not more than 5% by weight of the particles have a diameter greater than 250 $\mu$m, and 50% by weight of the particles have a diameter ranging from 150 to 160 $\mu$m.

Thanks to the use of the above-mentioned composition, the powder moulding process can be carried out in a mould heated to temperatures of less than 250° C., for example from 170 to less than 250° C., in particular from 190 to 245° C., more particular from 190 to 240° C.

Apart from the temperature of the mould, the equipments and process methods used for the powder moulding process of the present invention are those usually known, for example, for processing polyvinyl chloride.

As an example, the process of the present invention comprises the following steps:
A) heating the mould (in a oven, for example) to a temperature of less than 250° C., preferably from 190 to 245° C., more preferably from 190 to 240° C.;
B) depositing the polyolefin composition in the form of a powder in the mould and subsequently melting the said powder;
C) further melting the outside surface of the polymer article formed in the mould in step (B), by way of postheating (by means of hot air treatment for example), in order to eliminate possible surface irregularities; and
D) cooling and removing the shaped article thus obtained, which can optionally be subjected to further treatments, such as embossing.

The laminar articles with a complex shape thus produced, e.g. synthetic leathers, can be subjected to further treatments, such as painting and lacquering.

The said articles generally have a Shore D hardness of 45 points or less.

The following examples are given in order to illustrate but not limit the present invention.

The data relative to the properties of the used polymers, polymer compositions and articles obtained have been determined by way of the following methods:
Melt flow rate (MFRL): ASTM D 1238, condition L;
Melt flow rate (MFRE): ASTM D 1238, condition E;
Solubility in xylene: (see note 1 below);

Intrinsic viscosity: measured in tetrahydronaphthalene at 135° C.;
Melt peak: determined by DSC by using a Metler TC 11 apparatus. The temperature increases from 0 to 200° C. at a rate of 20° C./min.;
Shore A and D hardness: ASTM D 2240;
Tensile elastic modulus: ASTM D 638;
Tensile strength at yield: ASTM D 638;
Tensile elongation at yield: ASTM D 638;
Tensile strength at break: ASTM D 638;
Tensile elongation at break: ASTM D 638;
Tensile set: ASTM D 412.
Note 1

Determination of the percentage soluble in xylene: one prepares a solution of the sample in xylene at a weight concentration of 1%, keeping the sample in xylene for one hour at 135° C. while stirring. The content is allowed to cool to 95° C. while stirring, after which the solution is poured in a 25° C. bath, and left there for 20 minutes without stirring, and for an additional 10 minutes while stirring. The solution is then filtered, and acetone is added to a portion of the filtrate in order to obtain the precipitation of the dissolved polymer. The polymer thus obtained is then recovered, washed, dried, and then weighted in order to determine the percentage soluble in xylene.

The following polymers and polymer compositions are used in the examples:

Thermoplastic elastomeric polyolefin composition (I) having the MFR values as shown in Table 1. Said thermoplastic elastomeric polyolefin composition is obtained by way of chemical visbreaking of the following precursor composition having an MFRL of 0.6 g/10 min and comprising (weight percentages):

a) 33% of a crystalline propylene random copolymer with 4.3% of ethylene, containing 9% of a fraction soluble in xylene at 23° C. and having an intrinsic viscosity [η] of 1.5 dl/g;

b) 6% of an ethylene/propylene copolymer totally insoluble in xylene at 23° C.; and c) 61% of an amorphous ethylene/propylene copolymer with 30% of ethylene, totally soluble in xylene at 23° C., and having an intrinsic viscosity [η] of 3.1 dl/g.

The precursor composition is obtained by way of sequential polymerisation in the presence of a high-yield and highly stereospecific Ziegler-Natta catalyst supported on magnesium chloride.

The precursor composition is visbroken with 2,5-bis(tert-butylperoxy)-2,5-dimethylhexane (marketed by Akzo Nobel with the trademark Trigonox® 101/50) in an extruder.

Partially cross-linked thermoplastic elastomeric polyolefin composition, obtained by subjecting the above described precursor composition to dynamic cross-linking in the presence of Trigonox® 101/50 peroxide and 1,2-polybutadiene (Lithene PH). The intrinsic viscosity [η] of fraction (a) is about 0.35 dl/g. The percentage of gels calculated according to the formula set forth in the description is about 3.4. The cross-linked composition is prepared as described in European patent application EPA-633 289.

Poly(butene-1) (PB1) is a crystalline isotactic homopolymer of butene-1 with an MFRE of 20 g/10 min, and melting point (DSC method) of 124–126° C.

SEBS resin: it is a triblock copolymer with polystyrene end blocks and a rubbery poly(ethylene-butylene) mid block, commercialized by Shell Chemical Company with the trade name Kraton® G 1652.

SEBS resin: it is a three block copolymer with polystyrene end blocks and a rubbery poly(ethylene-butylene) mid block (S-EB-S) containing 14% by weight of styrene, commercialized by Shell Chemical Company with the trade name Kraton® G 1657.

EXAMPLE 1

The polymers listed in Table 1 are mixed and extruded in a twin screw extruder at 210° C. (die temperature: 220° C.) together with 4% by weight of a mixture of thermal and UV stabilisers.

The extruded compositions I–XIII are then milled at a temperature ranging from −70 to −100° C., thus obtaining a powder with a particle size distribution falling within the ranges reported in the description.

The milled products are then mixed with 0.5% by weight of silica (having trademark CAB-O-SIL® M 5 and commercialised by CABOT).

Finally, the powders are introduced in a mould heated to a temperature of 230° C. to carry out the slush moulding process. The slush time (the contact time between the powder and the mould) is 20 sec, followed by 1–2 min of postheating at the same temperature and subsequent cooling of the leather thus obtained. 1 mm thick foils are obtained.

Table 2 shows the MFRL of the compositions and the melt peaks of the foils produced by slush moulding.

Table 3 shows the mechanical properties and the hardness of the foils prepared with compositions I–XIII. All the foils are tested after 10 days at room temperature with the exception of samples 8 bis, 9 bis and 13 bis. The foils of samples 8 bis, 9 bis and 13 bis are tested after 1–5 hours from demoulding.

Comparative Example 1c

Example 1 is repeated, with the exception that instead of compositions I–XIII, composition XIV is used and the temperature of the mould at which the slush moulding process is carried out is 260° C.

Tables 2 and 3 show the MFRL of the composition in the form of powder and properties of the foils thus obtained.

EXAMPLE 2

Powder IX produced in example 1 is introduced in a mould heated to a temperature of 220° C. to carry out an industrial slush moulding process. The whole process cycle is 5 minutes long. The leather thus produced is in the form of a gloves box panel. The dimensions of the panel are 70×50 cm and thickness is 1 mm.

The leather is then used for preparing a composite panel made of three layers, namely the thus prepared leather, polyurethane foam and a stiff support.

EXAMPLE 3

Example 2 is repeated with the exception that powder XI is used instead of powder IX and the temperature of the mould is 240° C. Also in this case a leather in the form of gloves box panel, having excellent mechanical and surface properties, is obtained.

Comparative Example 2c

Example 2 is repeated with the exception that powder XIV is used instead of powder IX and the temperature of the mould is 260° C. The demoulding of article is very difficult.

TABLE 1

| Composition | Thermoplastic elastomeric polyofin composition (I) (w %) | | | | Cross-linked composition (I) (w %) | PB-1 (w %) | Kraton ® parts by weight |
|---|---|---|---|---|---|---|---|
| | MFRL 25 dg/min | MFRL 33 dg/min | MFRL 45 dg/min | MFRL 100 dg/min | | | |
| I | 31.25 | 0 | 0 | 0 | 0 | 68.75 | 0 |
| II | 52 | 0 | 0 | 0 | 0 | 48 | 0 |
| III | 73 | 0 | 0 | 0 | 0 | 27 | 0 |
| IV | 0 | 31.25 | 0 | 0 | 0 | 68.75 | 0 |
| V | 0 | 52 | 0 | 0 | 0 | 48 | 0 |
| VI | 0 | 73 | 0 | 0 | 0 | 27 | 0 |
| VII | 0 | 0 | 31.25 | 0 | 0 | 68.75 | 0 |
| VIII | 0 | 0 | 52 | 0 | 0 | 48 | 0 |
| IX | 0 | 0 | 73 | 0 | 0 | 27 | 0 |
| X | 0 | 0 | 68 | 0 | 0 | 32 | 45.4[1)] |
| XI | 0 | 0 | 68 | 0 | 0 | 32 | 45.4[2)] |
| XII | 0 | 0 | 0 | 52 | 0 | 48 | 0 |
| XIII | 0 | 0 | 47 | 0 | 31 | 22 | 31.62[2)] |
| XIV | 0 | 0 | 0 | 70 | 30 | 0 | 0 |

[1)]Kraton ® G 1652
[2)]Kraton ® G 1657

TABLE 2

| Sample | Powder of Composition | MFRL g/10 min | DSC 1° run Melt peak ° C. | DSC 2° run[1)] Melt peak ° C. |
|---|---|---|---|---|
| 1 | I | — | 122.9/151 | 110.1/148.5 |
| 2 | II | 372 | 123/152.3 | 110.1/148.5 |
| 3 | III | 31.5 | 123.1/150.5 | 110.2/144.3 |
| 4 | IV | 40.6 | 122.9/155.4 | 110.1/150.4 |
| 5 | V | 32.5 | 125.1/154.4 | 110.2/145.4 |
| 6 | VI | 32.9 | 123.3/150.4 | 110.4/144.4 |
| 7 | VII | 39.1 | 122.8/151.4 | 110/150.4 |
| 7bis | VII | 39.1 | 124.9/152 | 110/149.6 |
| 8 | VIII | 47 | 123/153.5 | 110.1/146.3 |
| 8bis | VIII | 47 | 126.1/55.3 | 109.1/147.1 |
| 9 | IX | 49.6 | 123/149.2 | 109.2/144.2 |
| 9bis | IX | 49.6 | 125.1/150.2 | 109.2/144.2 |
| 10 | X | 25.2 | 122.2/150.3 | 110.3/144.3 |
| 11 | XI | 28.5 | 122.2/150.3 | 110.3/144.3 |
| 12 | XII | — | 123.1/149.3 | 110.2/146.3 |
| 12bis | XII | — | 125/149.2 | 109/143.8 |
| 13 | XII | 21.6 | — | — |
| 1c | XIV | 44 | 147.1 | 142.1 |

[1)]This run was carried out on the same sample of polymer composition used in DSC 1° run and immediately after cooling the sample to 23° C.

TABLE 3

| Sample | Comp. | Tensile properties | | | | | Tensile set % | Shore A hardness Points |
|---|---|---|---|---|---|---|---|---|
| | | Elastic modulus MPa | Strength at yield MPa | Elong. at yield % | Strength at break MPa | Elong. at break % | | |
| 1 | I | 100 | 11.5 | 22.5 | 16 | 370 | — | 37[1)] |
| 2 | II | 80 | 7.7 | 13.7 | 9.4 | 275 | — | 90 |
| 3 | III | 60 | 4.8 | 13.5 | 5.9 | 190 | — | 88 |
| 4 | IV | 100 | 11.1 | 23.1 | 14.2 | 340 | — | 35[1)] |
| 5 | V | 85 | 7.8 | 9.2 | 9.2 | 260 | — | 89 |
| 6 | VI | 60 | 5.1 | 12.3 | 6 | 190 | — | 90 |
| 7 | VII | 110 | 11.1 | 19.8 | 14.4 | 350 | — | 37[1)] |
| 7bis | VII | 60 | 4.5 | 13.2 | 17.7 | 345 | — | — |
| 8 | VIII | 90 | 7.9 | 13.2 | 9 | 237 | — | 86 |
| 8bis | VIII | 65 | 4.6 | 16.6 | 10.2 | 300 | — | — |
| 9 | IX | 80 | 5.3 | 12.4 | 5.9 | 150 | — | 90 |
| 9bis | IX | 40 | 4.1 | 24.6 | 6.1 | 275 | — | — |
| 10 | X | 60 | 4.5 | 14.6 | 4.4 | 120 | — | 83 |
| 11 | XI | 55 | 4.2 | 20.4 | 4.8 | 210 | 47[2)] | 88 |
| 12 | XII | 90 | 7.7 | 14.4 | 8.2 | 170 | — | 90 |
| 12bis | XII | 60 | 4.3 | 19.7 | 9.3 | 290 | — | — |
| 13 | XIII | 50 | 4.4 | 30 | 5.2 | 280 | 24[2)] | 86 |
| 1c | XIV | 60 | 5.2 | 30 | 5.8 | 390 | 48[2)] | 90 |

[1)]Shore D hardness;
[2)]Test on compression moulded plaques with dimension of 12 × 12 × 0.2 cm and prepared with a heated plates press at 250° C. under a pressure of 0.0207 bar.

What is claimed is:

1. A process for the manufacture of a moulded article, the process comprising:
   powder moulding a polymer composition having a Shore D hardness value less than 40 points according to method ASTM D 2240; said polymer composition comprising:
   1) a polyolefin composition consisting of:
      i) 5 to less than 100% by weight of a crystalline or partially crystalline isotactic polymer of 1-butene; and
      ii) more than 0 to 95% by weight of a thermoplastic elastomeric polyolefin composition having a melt flow rate of 20–100 g/10 min (at 230° C. and 2.16 kg); or
   2) a polyolefin composition consisting of:
      iii) 100 parts by weight of a crystalline or partially crystalline isotactic polymer of 1-butene or composition (1); and
      iv) more than 0 to 100 parts by weight of an elastomeric polymer;
   with the proviso that when the polymer of 1-butene is a homopolymer or a copolymer with less than 2% by weight of comonomer, the polyolefin compositions (1) and (2) contain at least 5 parts by weight of an elastomeric polymer.

2. The process of claim 1 wherein the thermoplastic elastomeric polyolefin composition (ii) comprises (parts and percentages by weight):
   a) 10–40 parts of an isotactic propylene homopolymer having a content of fraction soluble in xylene at room temperature greater than 80%, or a propylene random copolymer with at least one comonomer selected from ethylene and $C_4$–$C_{10}$ α-olefins of formula $CH_2$=CHR, where R is a $C_2$–$C_8$ branched or linear alkyl radical; said copolymer containing greater than 80% of propylene and having a content of fraction soluble in xylene at room temperature greater than 80%;
   b) 0–20 parts of a copolymer containing ethylene, insoluble in xylene at room temperature; and
   c) 40–95 parts of an elastomeric fraction consisting of a copolymer of ethylene with at least one comonomer selected from $C_3$–$C_{10}$ α-olefins of formula $CH_2$=CHR, where R is a $C_1$–$C_8$ branched or linear alkyl radical, and optionally with a small quantity of diene; said fraction being soluble in xylene at room temperature, having an intrinsic viscosity ranging from 1 to 4 dl/g and containing ethylene in quantities less than 40%.

3. The process of claim 2, wherein the polymer composition used for powder moulding comprises (percentages by weight):
   i) 20–70% of a crystalline isotactic polymer of 1-butene; and
   ii) 30–80% of a thermoplastic elastomeric polyolefin composition.

4. The process of claim 1, wherein the elastomeric polymer (iv) is chosen from styrene polymers, elastomeric polymers of ethylene with propylene, and optionally small amounts of diene, containing from 40 to 75% by weight of ethylene; and elastomeric copolymers of ethylene with $C_4$–$C_{10}$ α-olefins of formula $CH_2$=CHR, where R is a $C_2$–$C_8$ linear or branched alkyl radical, having a narrow molecular weight distribution.

5. The process of claim 1, wherein the thermoplastic elastomeric polymer composition (ii) is partially cross-linked.

6. The process of claim 1 wherein the elastomeric polymer (iv) is partially cross-linked.

7. A composition for use in a powder moulding process, the composition comprising (percentages by weight):
   (1) from higher than 25 to 97% of a crystalline or partially crystalline polymer of 1-butene;
   (2) from 3 to less than 75% of a thermoplastic elastomeric polyolefin composition (I), which is optionally partially cross-linked; and, optionally,
   (3) an elastomeric polymer in amounts higher than 0 up to 100 parts by weight with respect to 100 parts of a mixture of components (1) and (2);
   wherein the composition has an MFR value of 20 to 100 g/10 min.

8. The composition of claim 7 wherein at least one of the thermoplastic elastomeric polyolefin composition (I) and elastomeric polymer (3) is partially cross-linked.

9. The composition of claim 7 or 8, wherein the elastomeric polymer (3) is chosen from styrene polymers; elastomeric polymer of ethylene with propylene, and optionally small amounts of diene, containing from 40 to 75% by weight of ethylene; and elastomeric copolymers of ethylene with $C_4$–$C_{10}$ α-olefins of formula $CH_2$=CHR, where R is a $C_2$–$C_8$ linear or branched alkyl radical, having a narrow molecular weight distribution.

10. The composition of claim 9 wherein the elastomeric polymer is a saturated or unsaturated block copolymer of styrene with an olefin.

11. A laminar article with a complex shape prepared with the compositions of claim 8.

12. The process according to claim 2 comprising (parts and percentages by weight) 20–40 parts of an isotactic propylene homopolymer having a content of fraction soluble in xylene at room temperature greater than 90%, or a propylene random copolymer with at least one comonomer selected from ethylene and $C_4$–$C_{10}$ α-olefins of formula $CH_2$=CHR, where R is a $C_2$–$C_8$ branched or linear alkyl radical; said copolymer containing greater than 80% of propylene and having a content of fraction soluble in xylene at room temperature greater than 80%.

13. The process according to claim 2 comprising (parts and percentages by weight) 40–80 parts of an elastomeric fraction consisting of a copolymer of ethylene with at least one comonomer selected from $C_3$–$C_{10}$ α-olefins of formula $CH_2$=CHR, where R is a $C_1$–$C_8$ branched or linear alkyl radical, and optionally with a small quantity of diene; said fraction being soluble in xylene at room temperature, having an intrinsic viscosity ranging from 1 to 4 dl/g and containing ethylene in quantities from 15 to 38%.

14. The composition according to claim 7 comprising (percentages by weight) from 26 to 70% of a crystalline or partially crystalline polymer of 1-butene.

15. The composition according to claim 7 comprising (percentages by weight) from 26 to 50% of a crystalline or partially crystalline polymer of 1-butene.

16. The composition according to claim 7 comprising (percentages by weight) from 30 to 74% of a thermoplastic elastomeric polyolefin composition (I), which is optionally partially cross-linked.

17. The composition according to claim 7 comprising (percentages by weight) from 50 to 74% of a thermoplastic elastomeric polyolefin composition (I), which is optionally partially cross-linked.

18. The composition according to claim 7 comprising elastomeric polymer in amounts from 5 to 100 parts by weight with respect to 100 parts of a mixture of components (1) and (2).

19. The composition according to claim 7 comprising elastomeric polymer in amounts from 5 to 60 parts by weight with respect to 100 parts of a mixture of components (1) and (2).

* * * * *